Patented Oct. 24, 1922.

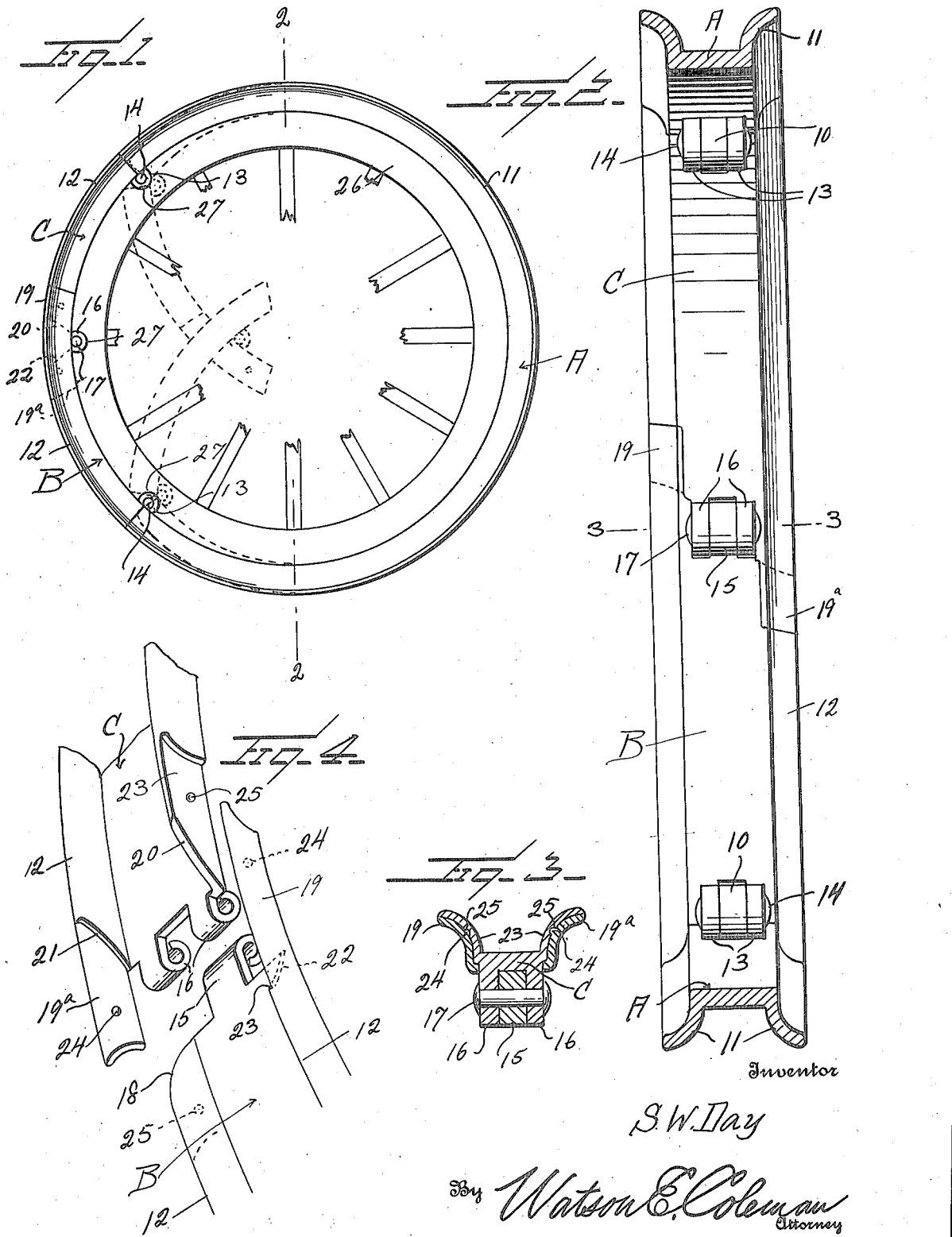

1,433,499

UNITED STATES PATENT OFFICE.

SUMNER W. DAY, OF LORAIN, OHIO.

COLLAPSIBLE RIM FOR AUTOMOBILE TIRES.

Application filed August 1, 1921. Serial No. 488,835.

*To all whom it may concern:*

Be it known that I, SUMNER W. DAY, a citizen of the United States, residing at Lorain, in the county of Lorain and State of Ohio, have invented certain new and useful Improvements in Collapsible Rims for Automobile Tires, of which the following is a specification, reference being had to the accompanying drawings.
This invention relates to collapsible rims for automobile tires, and particularly to that class of rims wherein the rim is made of a plurality of hinged sections so constructed that the sections may break inward when necessary to remove the tire and be forced outward to form a complete rim and support an inflated tire.

A further object is to provide a construction of this character which is so formed that an inflated tire will hold the rim absolutely solid.

And a further object is to so construct the rim that when used in connection with a felly of particular form, there will be no creeping tendency of the rim or tire.

Another object is to provide a construction of this character which is extremely simple, which is easy of operation, and which does not require the removal of any parts in order to collapse or expand the rim.

Other objects will appear in the course of the following description.

My invention is illustrated in the accompanying drawings, wherein:—
Figure 1 is an elevation of a collapsible wheel rim constructed in accordance with my invention, showing the rim collapsed in dotted lines;

Figure 2 is a vertical section on the line 2—2 of Figure 1;

Figure 3 is a section on the line 3—3 of Figure 2;

Figure 4 is a fragmentary perspective view of the wheel rim at the joint between the sections B and C, the sections being separated;

In the accompanying drawings, it will be seen that the rim consists of three sections A, B and C. The section A is relatively large and may extend approximately around ¾ of the total circumference of the rim. The sections B and C together have a length equal to ¼ approximately of the circumference of the rim. Any other proportion may be used, however.

The section A at its ends is formed with a medially disposed bead 10, this bead extending downward and formed by bending a tongue of metal extending from the middle portion of the section. The section A is also formed with the lateral flanges 11 which, as illustrated in Figure 3, preferably extend outward in divergent relation. These flanges may have any suitable form, however to receive any desired form of tire.

The section B is likewise formed with a middle portion and lateral, outwardly divergent flanges 12, and at one end the section B is formed with a pair of downwardly projecting beads 13 which coact with the bead 10 to form a knuckle joint, the beads being hingedly engaged with each other by means of a transversely extending pintle, pin, bolt or rivet 14.

The section C is of the same character as the section B and is provided with the outwardly projecting, lateral flanges and is hinged to the section A by the beads 13 engaging the bead 10 at that end and by a transversely extending pintle, pin or rivet 14. The section B at its end adjoining the section C is formed with a medially disposed tongue which is curved inward to form the bead 15, while the section C is formed to provide the laterally spaced beads 16 which receive between them the bead 15. These beads are held in hinged engagement with each other by means of the transversely extending pintle, pin or rivet 17.

It will be seen from Figure 4 that the flange 12 of section B on one side of the section is extended beyond the bead 15 to form a resilient tongue 19, while on the other side of the section B the flange 12 is bevelled off, as at 18, and terminates at the extremity of the section B. One of the flanges 12 of the section C is also extended, as at 19ª, to form a resilient tongue beyond the extremity of the section C so as to overlap the end of the flange 12 of section B, while the opposite flange of section C terminates at the extremity of the section and has a bevelled face 20 corresponding to the bevelled face 18 of the opposite flange of section B. The projecting portion 19ª of the flange 12 of section C is reduced in thickness, and at its junction with the main body of the flange 12 of section C there is formed an outwardly extending, slightly concave, rounded shoulder 21. The projecting tongue 19 of the section B is likewise reduced in thickness to provide a like bevelled shoulder 22.

Those flanges of the sections B and C which do not project beyond the extremity of the sections B and C are likewise reduced in thickness, as at 23, and the reduced projecting tongues 19 and 19ᵃ of the sections B and C overlap these reduced portions 23 of the sections B and C, as illustrated most clearly in the section Figure 3.

The inner face of each projecting tongue 19 on the sections B and C is formed with an inwardly projecting stud or boss 24, and the outer faces of the relatively thin portions 23 of the lateral flanges of sections B and C are formed with recesses 25 to receive said bosses. When the sections B and C are turned into alignment with each other, the bosses 24 will project into the sockets 25 and act to lock the sections B and C in alignment with each other, but upon the deflation of a tire it is possible to force the sections B and C inward at the knuckle joint, as illustrated in Figure 1, thus drawing in the ends of the section A and permitting the ready removal of the tire from the rim.

This rim is designed to be used in connection with a felly 26 having three grooves 27 in its outer face designed to receive the knuckle joints pivotally connecting the sections of the rim. By this arrangement, the rim, when in place on the felly, will be held firmly and prevented from creeping. It will be seen that in my construction the hinged joint between the sections is formed in the body of the rim and not in the flanges of the rim, but that these overlapping flanges act to lock the rim sections firmly in alignment with each other against independent lateral displacement, thus taking the strain off of the hinged joint between the sections B and C, and that by extending these flanges so that the flanges of the rim sections overlap each other, it is possible to provide the bosses and sockets 24 and 25 whereby the sections B and C will be locked in alignment with each other against accidental inward movement. Of course, when the rim is on the felly of a wheel, there is no possible chance of any inward movement of the rim sections and equally, of course, the tire when carried upon the rim will be inflated, while in order to remove a tire from the rim it must be deflated.

I claim:—

1. A collapsible rim for automobile tires consisting of a plurality of sections hinged to each other, two of said sections being hinged to each other for inward movement, all of said sections having flanges, one of the flanges in each of the last named sections being extended and overlapping the flange of the adjacent last named section, said overlapping portions of the flanges being reduced in thickness, and locking means on the confronting overlapping faces of the flanges whereby the sections may be held in alignment with each other.

2. A collapsible rim for automobile tires consisting of a single relatively large section and two relatively short sections, the short sections being hinged to the relatively large section for inward movement, the short sections being hingedly connected to each other at their abutting ends, all of said sections having flanges, one of the flanges of each short section being extended and overlapping the flange of the adjacent short section, said overlapping portions of the flanges being reduced in thickness, and locking means on the confronting overlapping faces of said flanges whereby the sections may be held in alignment with each other.

3. A collapsible rim for automobile tires consisting of a single relatively large section and two relatively short sections, the short sections being hinged to the relatively large section for inward movement, the short sections being hingedly connected to each other at their abutting ends, all of said sections having flanges, one of the flanges of each short section being extended and overlapping the flange of the adjacent short section, said overlapping portions of the flanges being reduced in thickness, and co-acting bosses and recesses formed on the confronting faces of the overlapping flanges whereby the flanges may be sprung into locking engagement with each other.

In testimony whereof I hereunto affix my signature.

SUMNER W. DAY.